United States Patent [19]

Milants

[11] 4,102,515
[45] Jul. 25, 1978

[54] TAPE CASSETTE

[75] Inventor: Lodewijk Luciaan Milants, Eindhoven, Netherlands

[73] Assignee: U.S. Philips Corporation, New York, N.Y.

[21] Appl. No.: 719,683

[22] Filed: Sep. 2, 1976

Related U.S. Application Data

[63] Continuation of Ser. No. 539,462, Jan. 8, 1975, abandoned.

[30] Foreign Application Priority Data

Feb. 1, 1974 [NL] Netherlands ............... 7401403

[51] Int. Cl.² ................... G03B 1/04; G11B 15/32; G11B 23/04
[52] U.S. Cl. .......................................... 242/199
[58] Field of Search ........................ 242/197–200; 206/389, 393; 360/93–96, 132; 174/107

[56] References Cited

U.S. PATENT DOCUMENTS

| 3,502,284 | 3/1970 | Loewenberg et al. | 242/199 |
| 3,675,875 | 10/1970 | Schmidt | 242/199 |

Primary Examiner—Leonard D. Christian
Attorney, Agent, or Firm—Frank R. Trifari; David R. Treacy

[57] ABSTRACT

A cassette for magnetic tape recordings, having a casing with bottom and cover walls, between which two winding hubs for the tape are captured. A corrugated plastic film is located between the tape winding and the bottom and cover wall respectively, the spring constant of the corrugated film ranging from about 100 to 400 grams/mm. A flat film is disposed between the tape winding and the corrugated film to ensure even distribution of forces exerted on the tape.

2 Claims, 7 Drawing Figures

TAPE CASSETTE

This is a continuation of application Ser. No. 539,462, filed Jan. 8, 1975 now abandoned.

BACKGROUND OF THE INVENTION

1. Field of the Invention

The invention relates to a tape cassette for use in an apparatus for recording and/or playing back magnetic registrations on a recording tape, which cassette has a casing comprising a bottom and cover wall as well as side walls, in which two winding hubs for winding and unwinding the tape respectively are provided, a corrugated film being located between the tape winding and the bottom and cover wall respectively.

2. Description of the Invention

A tape cassette of this type is known from U.S. Pat. No. 3,675,875. The material of which the corrugated film used in said known cassette is made is a synthetic material such as polyester, having a thickness of 12 to 50 $\mu$m. The corrugated film has between about 2 to 20 corrugations per cm., the corrugation ratio ranging between the values 1.5 and 15, said corrugation ratio being defined as the ratio between the thickness of the corrugated film and the material thickness of the original film. It has been found that the spring constant of the known film, which is defined as the ratio of the force which is exerted on the film and the deflection of the film, is relatively high and that the film is consequently relatively stiff, so that the behaviour of said film does not differ appreciably from the conventional flat films. Especially when this magnetic tape is used — in the order of 9 $\mu$m — problems will occur. The tape run in the cassette appears to be disturbed in that the tape is warped about its longitudinal axis and is trapped between the tape winding and film, so that the cassette can no longer be used. Another serious problem is jamming of the tape winding in the cassette due to the growing of the winding on the axial direction so-termed telescoping of the tape coil. In the event of telescoping the tape becomes jammed against the bottom or cover wall of the cassette, so that the winding friction of the apparatus is no longer capable of winding the tape any further. This gives rise to so-called tape spilling near the capstan of the apparatus, because the tape is still being transported by the capstan/pressure roller combination.

SUMMARY OF THE INVENTION

According to the invention these problems are overcome in that, in a tape cassette of the type described above the corrugated film is made resilient, the spring constant having a value ranging from about 100 to 400 grams/mm. The resilient film according to the invention has the advantage that — in the event of telescoping of the tape winding — the winding friction of the apparatus remains capable of winding the tape, so that jamming of the tape in the cassette is avoided. Moreover, the risk of the tape being caught between the tape winding and the film is substantially reduced because of the resilient film. The spring constant of a corrugated film according to the invention is preferably about 200 grams/mm.

In a preferred embodiment of the invention a flat film is disposed between the corrugated film and the tape winding. This measure ensures a better distribution of the compression forces exerted by the corrugated film on the tape winding and excludes the possibility of the tape getting between the corrugations of the corrugated film.

According to another aspect of the invention the corrugated film, whose corrugations extend parallel to the long sides of the rectangular bottom and cover wall respectively, is flat in a central zone which extends parallel to the corrugations and is affixed to the flat film at one or more points of said flat zone. The composite film thus obtained facilitates the assembly of the cassette from various parts, while attachment at points in the central flat zone of the corrugated film has the advantage that the corrugations of the film can move freely relatively to the flat film.

Some embodiments of the invention will be described in more detail with reference to the drawings.

Figure 1:
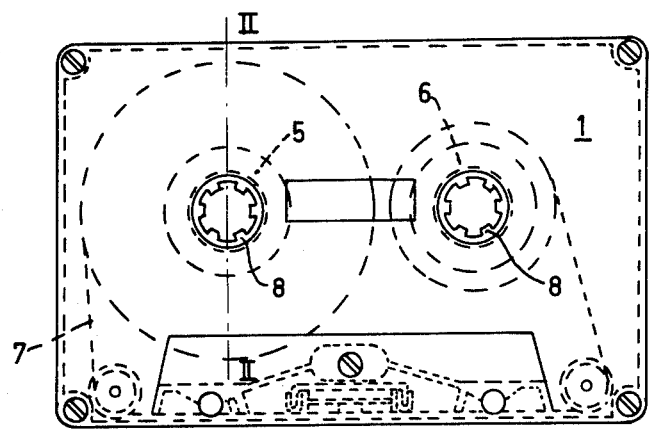
FIG. 1 is a plan view of a cassette according to the invention.

As is shown in the drawing a tape cassette for use in an apparatus for recording and/or playing back magnetic registrations, comprises a casing 1, which comprises a rectangular bottom wall 2, a cover wall 3 and side walls 4. In the casing two winding hubs 5,6 are located for winding and unwinding a recording tape 7 respectively. Both in the bottom section 2 and in the cover 3 two openings 8 and 9 respectively are formed to allow the cassette to be placed on the winding spindles of a recording/playback apparatus not shown.

Figure 2:
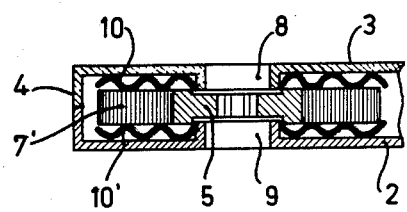
FIG. 2 is a partial cross-section of said cassette taken on the line II—II in FIG. 1.
Figure 3:
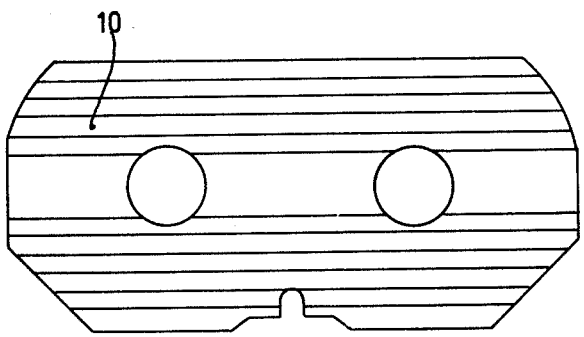
FIG. 3 is a plan view of a corrugated film employed in the tape cassette according to the invention, FIG. 4 schematically shows an arrangement for measuring the spring constant of a corrugated film.
Figure 4:
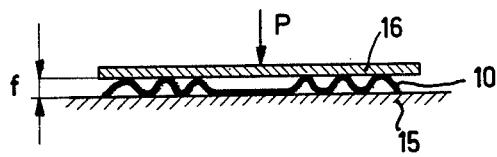

As appears from FIG. 2, a corrugated film 10',10', which is shown in plan view in FIG. 3, is disposed between the tape coil 7' wound on the hubs 5,6 and the bottom and cover wall 2,3 respectively. The film consists of a synthetic material, for example polyester. The parameters of the film, such as selected material, thickness of the basic material, corrugation height of the corrugations and number of corrugations per centimeter have been selected so, according to the invention, that the corrugated film 10,10' is resilient and has a spring constant of from about 100 to 400 grams/mm. Said spring constant is measured with an arrangement which is schematically shown in FIG. 4. The film is placed on a flat base 15 and subsequently loaded by flat plates 16. Thus, the ratio between the load P and displacement $f$ of the film can be determined. A suitable test method is a capacitive measuring method, known per se.

Figure 5:
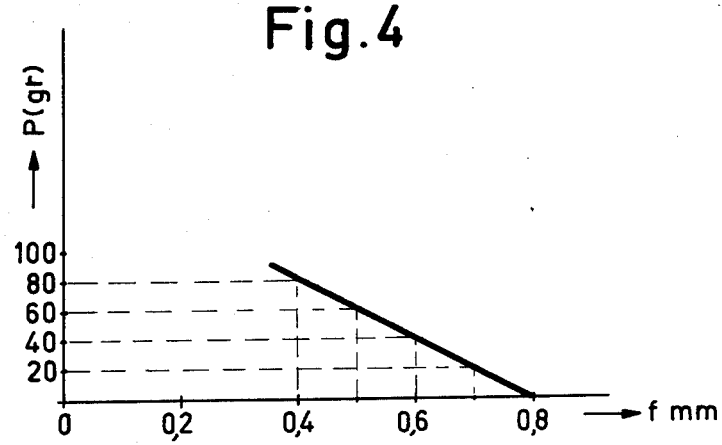
FIG. 5 is a diagram of some results of measurements on a corrugated film according to the invention.

In a specific embodiment of a corrugated film according to the invention the basic material is a polyester film having a thickness of 19 $\mu$m. The height of the corrugations is 0.8 mm. Over the width of the film, which is approximately 4.5 cm. 5 to 6 corrugations are provided. The test results of such a film are shown in the diagram of FIG. 5, which reveals that the elastic constant is 20 grams/0.1 mm or 200 grams/mm.

It is to be noted that the invention is not limited to a corrugated film with horizontally extending corrugations as shown in FIG. 3. The film according to the invention may also have vertical corrugations or corrugations which extend radially relative to the holes in the film, provided that such a film is resilient and has a spring constant in the order of 100 to 400 grams/mm.

Figure 6:
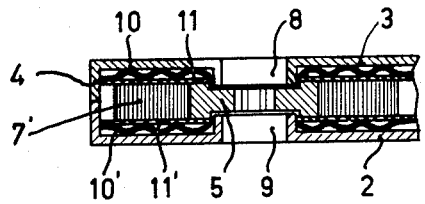
FIG. 6 is a cross-section similar to FIG. 2, of a modified embodiment of a cassette according to the invention.

As appears from FIG. 6, a flat film 11,11' is disposed between the tape winding 7' and the corrugated film 10,10'. The compressive forces exerted on the tape winding by the corrugated film are thus uniformly distributed over the tape winding, thus avoiding trapping of the tape between the corrugations of the corrugated film.

Figure 7:
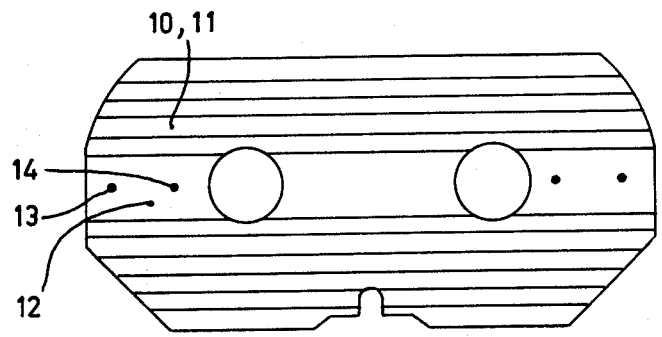
FIG. 7 is a plan view of a combined corrugated and flat film used in the cassette of FIG. 6.

FIG. 7 shows a plan view of a combination of a corrugated and flat film 10,11 employed in the cassette of FIG. 6. In the Figure the corrugations of the corrugated film extend horizontally, i.e., parallel to the long sides of the rectangular bottom and cover walls 2,3. The corrugated film is flat in a central zone 12 which extends parallel to the corrugations and is affixed to the flat film at some points 13,14 in said flat zone. Thus, the freedom of movement of the corrugations of the corrugated film relative to the flat film is maintained.

What is claimed is:

1. A cassette for magnetic recording tape, comprising a casing having a bottom wall, a cover wall, and side walls; two winding hubs for winding and unwinding the tape respectively, fitted within the casing, and adapted for receiving a tape winding about said hubs between the bottom and cover walls; first and second corrugated films located between the tape winding and said bottom and cover walls respectively; and first and second flat films disposed between said corrugated films and said tape winding respectively, wherein said corrugated films are resilient films having parallel corrugations and having a material composition, thickness, corrugation height and number of corrugations per centimeter selected to produce a spring constant having value between approximately 100 and 400 grams/mm.

2. A cassette as claimed in claim 1, wherein said first and second corrugated films each comprise a flat central zone extending parallel to said corrugations, the respective flat central zones of the corrugated films being affixed at least at one point each to said respective flat films.

* * * * *